(12) United States Patent
Stonecipher

(10) Patent No.: US 9,985,315 B1
(45) Date of Patent: May 29, 2018

(54) HYDROTHERMAL CARBON ANODE, POLYMER STABILIZED, SODIUM-ION CELL

(71) Applicant: Caterpillar Inc., Peoria, IL (US)

(72) Inventor: Kenneth Stonecipher, Metamora, IL (US)

(73) Assignee: Caterpillar Inc., Deerfield, IL (US)

(*) Notice: Subject to any disclaimer, the term of this patent is extended or adjusted under 35 U.S.C. 154(b) by 209 days.

(21) Appl. No.: 14/919,907

(22) Filed: Oct. 22, 2015

(51) Int. Cl.
| | |
|---|---|
| *H01M 4/50* | (2010.01) |
| *H01M 10/0567* | (2010.01) |
| *H01M 4/1393* | (2010.01) |
| *H01M 10/054* | (2010.01) |
| *H01M 4/587* | (2010.01) |
| *H01M 4/04* | (2006.01) |
| *C01B 31/02* | (2006.01) |
| *H01M 4/02* | (2006.01) |

(52) U.S. Cl.
CPC ..... *H01M 10/0567* (2013.01); *C01B 31/0206* (2013.01); *H01M 4/0471* (2013.01); *H01M 4/502* (2013.01); *H01M 4/587* (2013.01); *H01M 10/054* (2013.01); *H01M 2004/027* (2013.01); *H01M 2300/0028* (2013.01)

(58) Field of Classification Search
CPC ......... H01M 10/0567; H01M 10/054; H01M 4/0471; H01M 4/587
See application file for complete search history.

(56) References Cited

U.S. PATENT DOCUMENTS

| | | | | |
|---|---|---|---|---|
| 2009/0253025 A1* | 10/2009 | Whitacre | ............... | H01G 11/06 429/50 |
| 2012/0164499 A1* | 6/2012 | Chiang | ................. | H01M 8/188 429/81 |
| 2014/0017574 A1* | 1/2014 | Ito | ........................ | H01M 4/366 429/332 |
| 2014/0186719 A1* | 7/2014 | Wang | ..................... | H01M 4/58 429/309 |
| 2015/0064568 A1* | 3/2015 | Yushin | .............. | H01M 10/0525 429/233 |
| 2015/0333326 A1* | 11/2015 | Lee | ....................... | H01M 4/366 429/225 |

FOREIGN PATENT DOCUMENTS

| | | |
|---|---|---|
| CN | 104300124 A | 1/2015 |
| KR | 10-1486649 B1 | 1/2015 |
| KR | 10-1498797 B1 | 3/2015 |

OTHER PUBLICATIONS

Zhian Zhang, Xing Yang, Yun Fu, and Ke Du, "Ultrathin molybdenum diselenide nanosheets anchored on multi-walled carbon nanotubes as anode composites for high performance sodium-ion batteries", Jul. 18, 2015, Journal of Power Sources 296 (2015), 2-9.*
Ece Unur, Sergio Brutti, Stefania Panero, and Bruno Scrosati, "Nanoporous carbons from hydrothermally treated biomass as anode materials for lithium ion batteries", Mar. 4, 2013, Microporous and Mesoporous Materials 174 (2013) 25-33.*
Xiao et al., "Hydrothermal Carbonization of Lignocellulosic Biomass," *Bioresource Technology*, 118, Aug. 2012, pp. 619-623.

* cited by examiner

*Primary Examiner* — Jonathan G Jelsma
(74) *Attorney, Agent, or Firm* — Leydig, Voit & Mayer, Ltd.; Edward Y. Lin

(57) ABSTRACT

An electrical power cell includes a cathode capable of accepting sodium ions, an anode comprising one or more hydrothermal carbon (HTC) nano-structures, and an electrolyte in contact with the anode and the cathode, the electrolyte comprising a solid electrolyte inter-phase (SEI) inhibitor.

14 Claims, 5 Drawing Sheets

HYDROTHERMAL CARBON ANODE, POLYMER STABILIZED, SODIUM-ION CELL

TECHNICAL FIELD

This patent disclosure relates generally to batteries and, more particularly to a stabilized sodium ion cell having a hydrothermal carbon anode.

BACKGROUND

With the increasing popularity of portable electronic devices, demand for portable energy sources is increasing, both for portable and non-portable devices. There is also a prevalent sentiment and desire to use energy sources that are environmentally friendly. A majority of batteries currently in such use are of the type that is generally referred to as lithium ion batteries (Li-ion or LIB). Li-ion batteries include cells that are rechargeable and use lithium ion migration from a cathode to an anode during discharge, and in the reverse direction when charging. Li-ion batteries commonly use an intercalated lithium compound as a cathode material, and have a relatively high energy density, a low degradation of performance over charge/discharge cycles, and a relatively slow discharge rate when not in use. Beyond small, portable electronic applications, Li-ion batteries are gaining popularity in larger applications such as electric vehicle and aerospace applications.

Aside from their high power density and repeatable performance characteristics, Li-ion batteries can be dangerous under some conditions. For example, Li-ion batteries may use a flammable electrolyte and should be kept pressurized and partially charged when transported. Moreover, lithium reserves are becoming scarce on a global scale, which increases prices and decreases availability of lithium for battery manufacturers and consumers.

One potential replacement for Li-ion batteries are batteries using sodium ion cells. The so called sodium-ion (Na-ion) batteries stand out because sodium is cheaper, non-toxic, and more abundant than lithium. Currently, one known drawback of Na-ion batteries is their long charge and discharge times. In general, there is a tradeoff between the charge/discharge rate and capacity, so that attempts to increase the charge/discharge rate have resulted in severely reduced capacity. Moreover, at present, widespread Na-ion cell or battery use has been generally unsuccessful because of the irreversible capacity loss attributed to formation of a solid electrolyte interface (SEI) layer on the surface of the cells' anodes, which blocks access of ions to the cell's electrodes, thus greatly shortening the energy producing life and capability of the cell.

SUMMARY

The disclosure describes, in one aspect, an electrical power cell. The electrical power cell includes a cathode capable of accepting sodium ions, an comprising one or more hydrothermal carbon (HTC) nano-structures, and an electrolyte in contact with the anode and the cathode, the electrolyte comprising a solid electrolyte inter-phase (SEI) inhibitor.

In another aspect, the disclosure describes a method for manufacturing sodium-ion battery cells using biomass material. The method includes providing a biomass to a pretreatment process, heating the biomass in a strongly acidic environment to form a slurry, and filtering the slurry to separate hydrolysis products from other byproducts. The hydrolysis products are subjected to a hydrothermal process to provide a porous nano-structured carbon material, and the porous nano-structured carbon material is at least partially deposited or formed onto an anode. The method further includes placing the anode into a casing, providing a cathode capable of accepting sodium ions, and placing the cathode into the casing. The method also includes adding an electrolyte into the casing, the electrolyte being in contact with the anode and the cathode; and stabilizing the sodium-ion battery cell by adding a solid electrolyte inter-phase (SEI) inhibitor in mixture with the electrolyte.

DETAILED DESCRIPTION

This disclosure relates to batteries that include biodegradable anodes and, more particularly, batteries that can be constructed of non-toxic or dangerous ingredients that are biodegradable. In one disclosed embodiment, a procedure is used to manufacture hydrothermal carbons (HTC) in a large scale and in the form of porous nano-structured HTC (NSHTC) from biomass materials. The NSHTC is then formed into an anode for a Na-ion battery, which advantageously maintains an increased charge capacity as compared to other, known Na-ion batteries, by incorporating a pyromellitic acid stabilizer (PMA) into the electrolyte of the cell to reduce formation of a solid electrolyte inter-phase (SEI) layer on the anode.

In one aspect, therefore, the present disclosure describes use of biomass materials using an HTC process to produce carbon nano-materials, which are used to produce anodes for sodium ion batteries. In the past, this process has been unsuccessful because an irreversible capacity loss contributed to the formation of solid electrolyte interface on the anode surface material. This has greatly shortened to energy producing life of the sodium ion batteries. The present disclosure solves this process by using pyromellitic action on the anode material surface to prevent SEI buildup. This layer of graphitization of the polymer prevents SET thickness propagation and solves the problem of SEI buildup. The solution is also compatible with the HTC carbonization material used in the anode production. In general, the systems and methods described herein reduce the environmental impact of conventional battery manufacture, use and disposal, and reduce the risks associated with making, using and disposing of the more commonly used Li-ion batteries.

Figure 1:
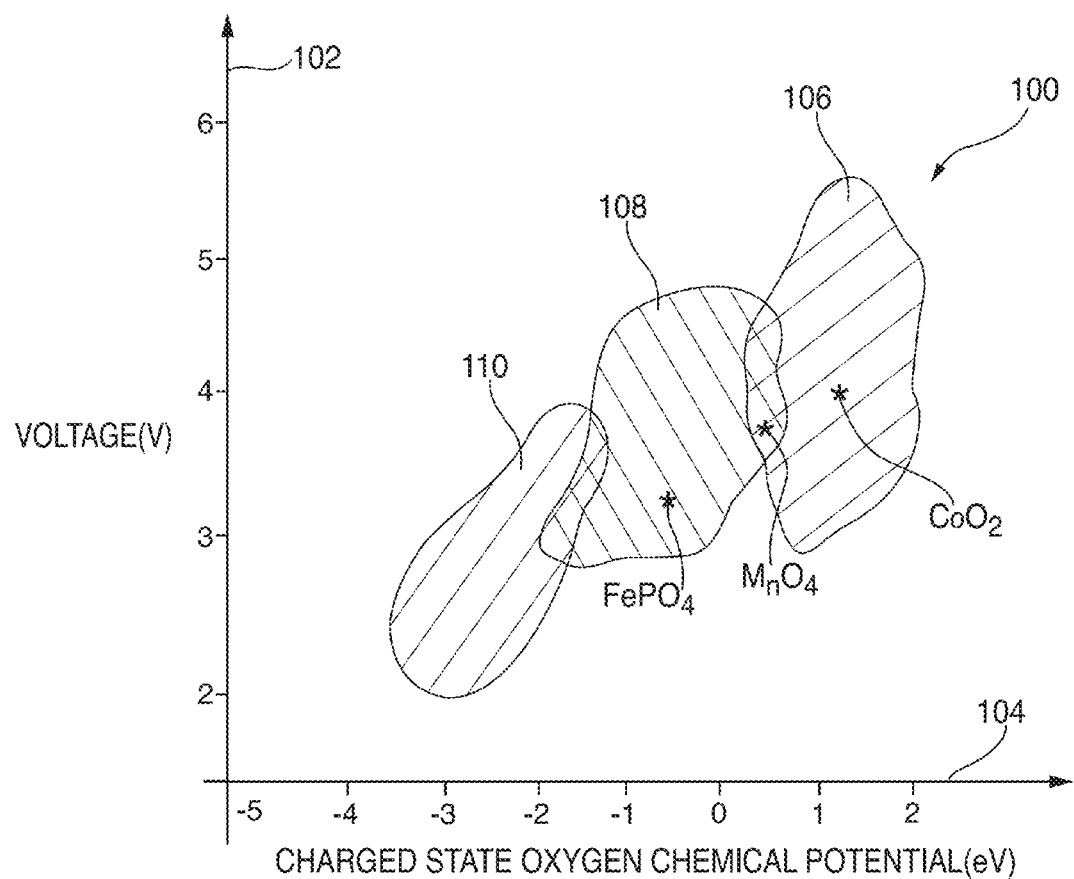
FIG. 1 is a qualitative graphical representation of the relative chemical potential energy included during operation of various cells in accordance with the disclosure.

A qualitative graphical representation of the relative chemical potential energy included during operation of various cells in accordance with the disclosure is shown in FIG. 1. For illustration of at least some of the advantages of the cells in accordance with the present disclosure, the voltage that can be achieved from a battery cell with respect to the charged state oxygen chemical potential of various oxides used, or which are present in cells during discharging or charging processes, are plotted in the graph 100 of FIG. 1, where voltage, in Volt (V), extends along the vertical axis 102 and the chemical potential, in electron-Volt (eV), extends along the horizontal axis 104.

As can be seen from the graph 100, a first bounded area 106 represents the approximate ranges of metal oxides such as Cobalt oxide ($CoO_2$), which is denoted on the graph, and others that may typically occur in conventional Lithium ion cells and batteries. The various metal oxides included in the first bounded area 106 have relatively higher chemical potentials ranging from 0 to about 2 eV and producing cell output voltages ranging from 3 to about 5.5 V. A second bounded area 108 represents the approximate ranges of metal oxides such as Manganese oxide ($Mn_2O_4$) or $FePO_4$, which are also denoted on the graph, and others that may typically occur in conventional Sodium Ion cells and batteries. The various metal oxides included in the second bounded area 108 have relatively lower chemical potentials than those of metal oxides belonging to the first bounded area. As a result, the chemical potentials in the second bounded area 108 range from about −2 to 1 eV and produce cell output voltages of about 3 to 5 V. The lower chemical potentials make Sodium ion cells safer and more stable than Lithium ion cells.

In accordance with the disclosure, the stabilized sodium ion cells with HTC anodes will generally produce and use metal oxides belonging in a third bounded area 110, which encompasses metal oxides having even lower chemical potentials ranging from −4 to about −1 eV and yield cell voltage outputs potentials of between 2 to 4 V. Because of the expected lower chemical potentials, the stabilized sodium ion cells with HTC anodes in accordance with the disclosure will be safer and more stable than conventional sodium ion cells.

Figure 2:
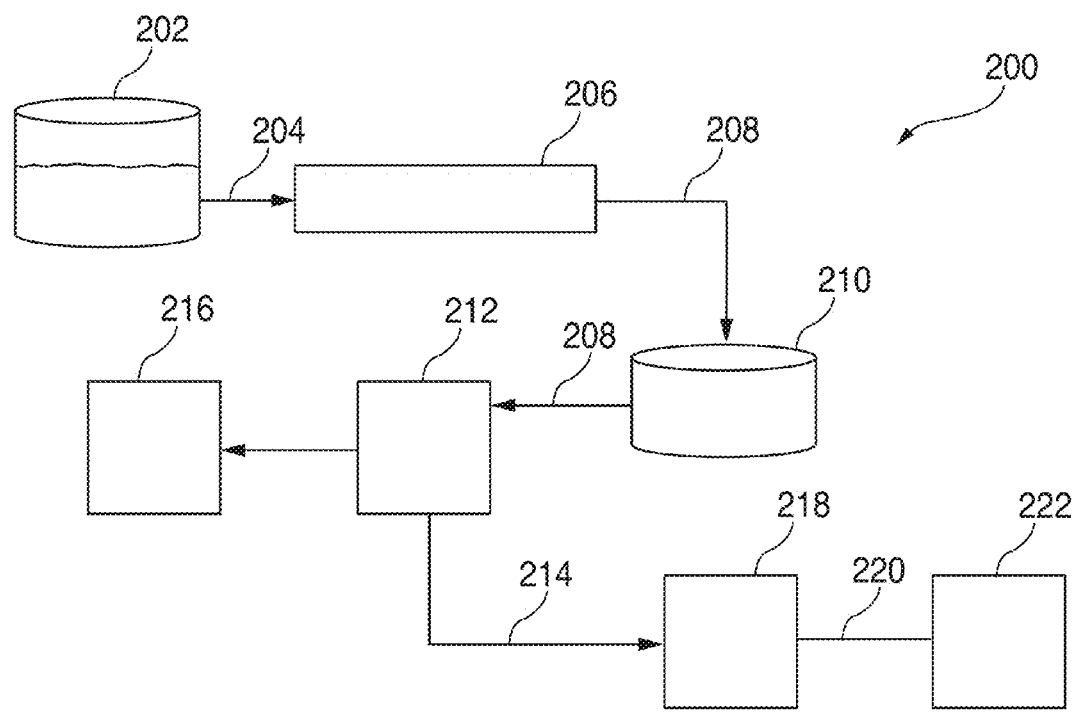
FIG. 2 is a block diagram for a method of producing anodes for cells in accordance with the disclosure.

A block diagram for a process 200 of manufacturing HTC material for use as anodes in the described cells is shown in FIG. 2. The process 200 utilizes a source of biomass 202, which may be procured by any suitable means such as from recycled waste. Biomass 204 from the source of biomass 202 is provided to a pretreatment process 206, which in the illustrated embodiment is heated and maintained in a corrosive, acidic pH range. As shown, the pretreatment process 206 heats the biomass 204 to about 200° C. and maintains a strongly acidic environment having a pH of less than about 2.

The pretreatment process 206 breaks down, cooks and generally transforms the biomass 204 into a slurry 208, which is collected in a reservoir 210, where it may undergo a fermentation process. From the reservoir 210, which may include mixers, heaters and other devices, the slurry 208 is provided to a separation filter 212 that separates hydrolysis products 214 from other byproducts such as cellulose, lignin and others, which are collected and disposed of, for example, in a landfill 216. The separation filter may be any kind of suitable filter that is known for separation of solids and liquids. Filtration at the separation filter may be augmented such as by application of vacuum, pressure, or centrifugal force, and may also use a filter press. The hydrolysis products 214, which consist of mostly carbon, undergo a hydrothermal process 218 such that the carbon atoms are arranged into a porous, nano-structured HTC material 220 that is then used in an anode forming process 222 to manufacture anodes for sodium ion battery cells in accordance with the disclosure.

In the illustrated embodiment, the HTC process 218 includes a combination of temperature and pressure applied to the materials to carbonize the biomass. In one embodiment, the process includes heating the material in a water solvent at a temperature of between 130 to 280° C., at a pressure that is less than about 10 bar. The results of this process are nano-structured carbon, and carbon-containing compounds or differently arranged carbon atoms, which are also sometimes referred to as carbon hybrids. In general, any hydrothermal carbonization process of lignocellulosic biomass can be used in the manufacture of hydrolysis products. One example of such a process can be seen in "Hydrothermal carbonization of lignocellulosic biomass," L.-P. Xiao et al.; Bioresource Technology 118 (August, 2012), pp. 619-623, which is incorporated herein by reference. The anodes for use in cells in accordance with the disclosure are made from hydrothermal carbon nano-particles and are biodegradable.

Figure 3:
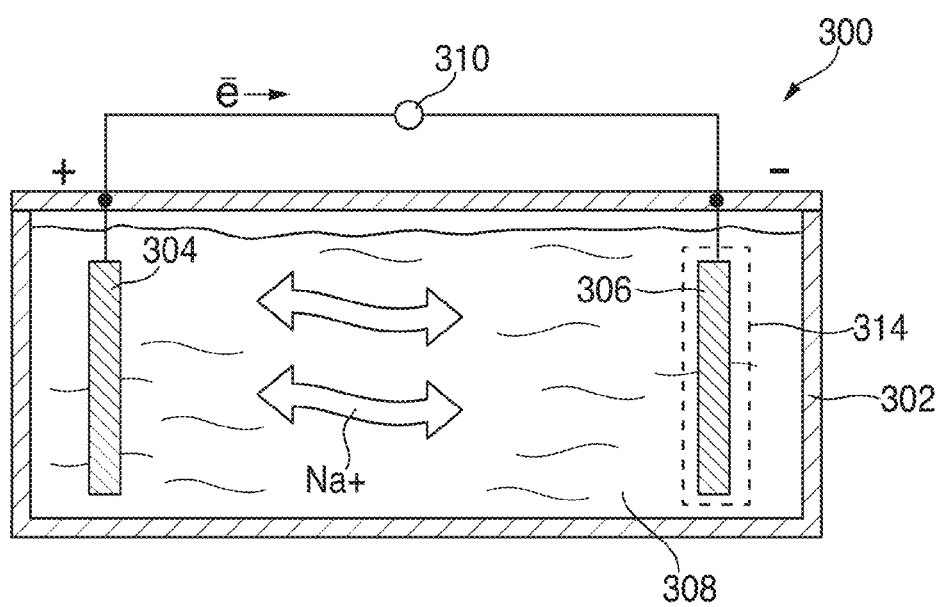
FIG. 3 is a schematic diagram of a Na-ion cell in accordance with the disclosure.

A schematic diagram of a Na-ion cell 300 having an HTC anode in accordance with the disclosure is shown in FIG. 3. The cell 300 includes a casing 302 that includes a cathode 304 and an anode 306 immersed in an electrolyte 308, which in the illustrated embodiment is an aqueous solution of sodium chloride (NaCl). An electrical load 310 is shown to illustrate the discharge condition, during which electrons flow from the anode to the cathode in the direction of the arrow illustrated, while sodium ions ($Na^+$) ($Na_{(0.44)}$) travel through the electrolyte 308 in the opposite direction, i.e., from the cathode to the anode. In the illustrated embodiment, the cathode 304 contains manganese oxide $Mn_2O_4$, which is capable of accepting sodium ions from the electrolyte solution. The anode 306 is made from, or at least includes, a layer of hydrothermal carbon (HTC) nanoparticle structures, which cover at least a portion of an outer surface of the anode 306. The HTC nanoparticle structures shown make up about a 25 wt % of the layer material of the anode and have an average size of about 10 nm. The electrolyte 308 includes of 2.25 mmol l(−1) PMA, 0.75 mmol l(−1) hexamethonium hydroxide, and 12 mmol l(−1) triethanolamine (TEA). The pyromellitic acid stabilizer (PMA) has a pH of about 7.8+/−0.1, which means that the PMA, its salts and other derivatives may be present during use. The PMA is used to inhibit formation of, de-scale deposits of, or at least discourage formation of an inhibiting layer of solid electrolyte inter-phase (SEI) layer deposits on the anode. In other words, the PMA operates as an SEI layer inhibitor on the anode 306. Various suitable PMA materials include inorganic and organic anion based on poly(2,6-dimethyl-1,4-phenylene oxide) (PPO). During discharge, positively charged sodium ions (Na+) travel from the anode 306 to the cathode 304, and during charging of the cell 300, the Na+ ions travel from the cathode 304 back to the anode 306 through the electrolyte 308. Without wishing to be limited by any theory, it is believed that the presence of the SEI layer inhibitor enables and facilitates access of the sodium ions to the anode.

Figure 4:
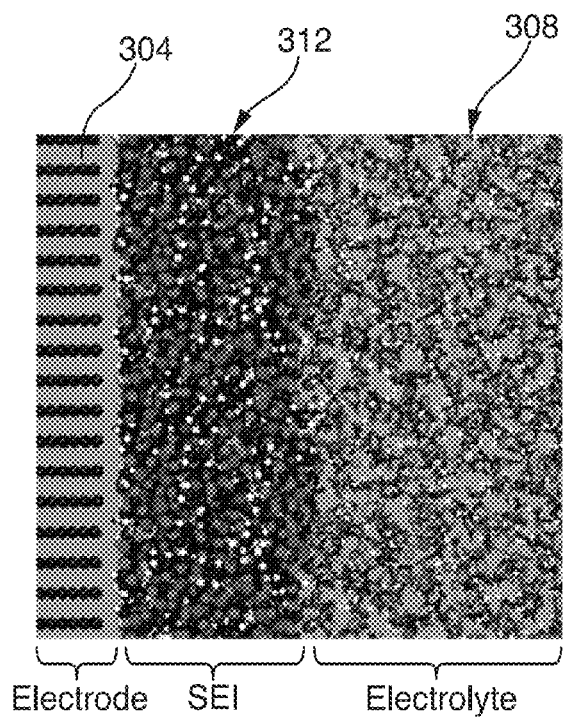
FIGS. 4 and 5 are enlarged detailed view of anodes in accordance with the disclosure.
Figure 5:
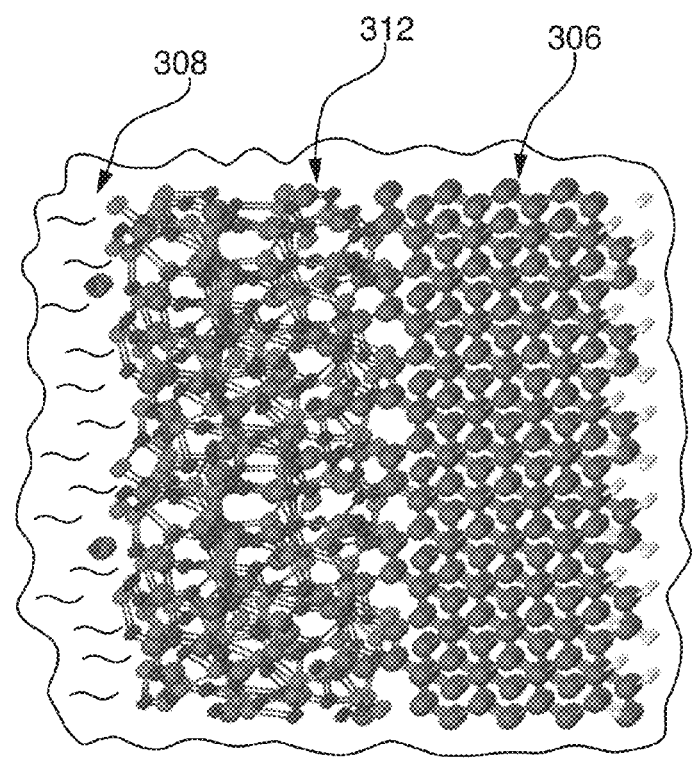

FIGS. 4 and 5 are enlarged detailed view of anodes in accordance with the disclosure to illustrate the formation of a solid electrolyte inter-phase (SEI) layer that can form in Na-ion cells. As shown in FIG. 4, a layer of SEI 312 may form on the electrode, in this case, the cathode 304, when the cell 300 is charging. Similarly, as shown in FIG. 5, another SEI layer 312 may form on the anode 306 during discharge of the cell 300. By incorporating the PMA stabilizer into the electrolyte 308, the thickness of the SEI layer 312 that forms during charging or discharging may be minimized, or even eliminated, thus maintaining a maximum performance of the cell. As is known, the presence of an SEI layer may inhibit access of the $Na^+$ ions to and from the cathode or anode materials during charging or discharging, thus reducing the electrical output potential of the cell and reducing its power capacity. In one embodiment, the HTC carbon nano-structures are formed as nano-tubes, which is believed to further facilitate access and transmission or passage of the sodium ions through the anode, thus increasing cell performance.

INDUSTRIAL APPLICABILITY

Figure 6:
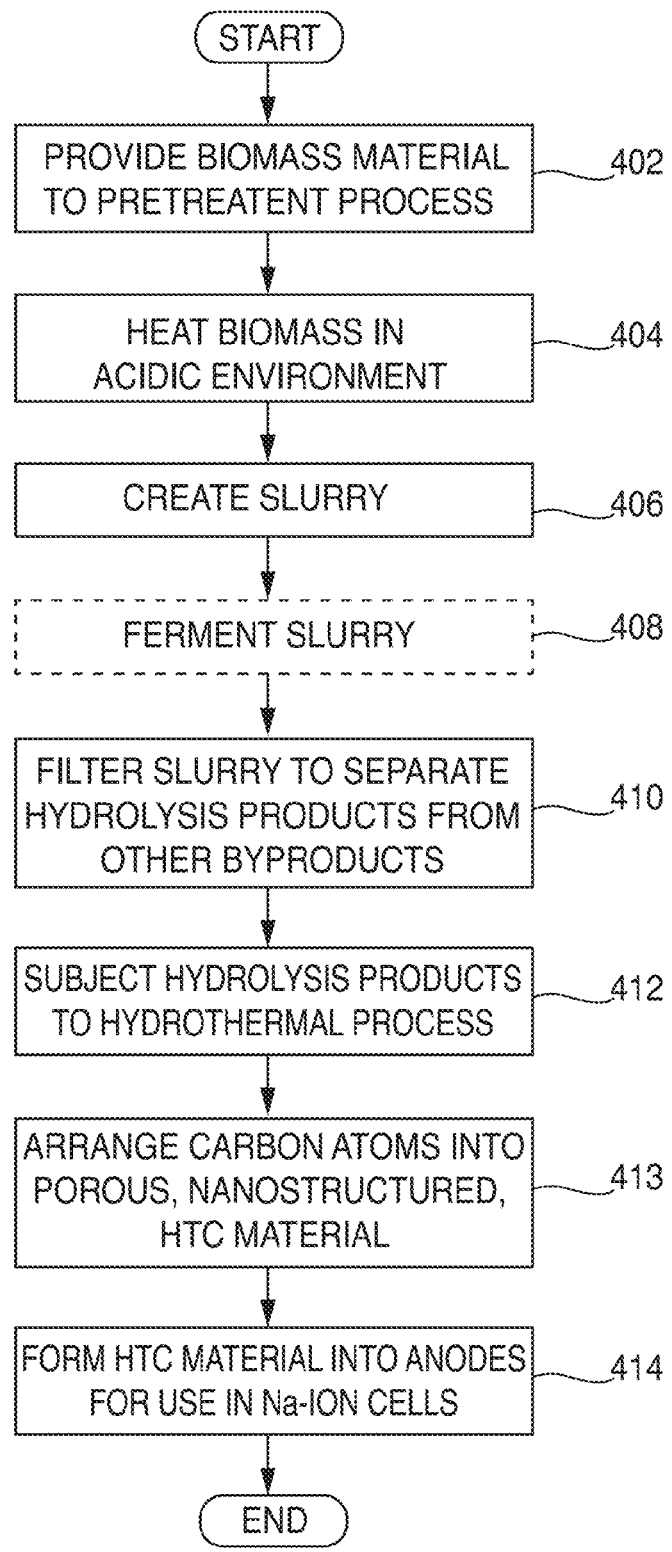
FIG. 6 is a flowchart for a method of constructing a battery in accordance with the disclosure.

The present disclosure is applicable to electrical power cells and, more particularly, to Na-ion cells using HTC anodes that include a pyromellitic stabilizer used with the cell's electrolyte to reduce and/or eliminate the formation of an SEI layer on the cell's electrodes. A method for constructing such cells using biomass materials to produce HTC anodes that are biodegradable and yield cells that are safer to operate and more stable than conventional Na-ion cells is shown in the flowchart of FIG. 6. The process includes providing an amount of biomass material to a pretreatment process at 402. For example, the biomass material may be lignocellulosic biomass, which can include materials readily available in the environment such as agricultural residue, herbaceous crops, woody crops, forestry residues, waste paper and other municipal and/or industrial waste. The pretreatment process includes heating the biomass in an acidic environment at 404 to create a slurry at 406. The slurry may undergo an optional fermentation process at 408 before being filtered at 410 to separate hydrolysis products from other byproducts such as cellulose, lignin and others. The hydrolysis products, which consist of mostly carbon, undergo a hydrothermal process at 412 such that the carbon atoms are arranged into a porous, nano-structured HTC material at 413. The HTC material is used to form anodes at 414 for use in Na-ion battery cells.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. An electrical power cell, comprising:
    a cathode capable of accepting sodium ions;
    an anode, the anode comprising one or more hydrothermal carbon (HTC) nano-structures; and
    an electrolyte in contact with the anode and the cathode, the electrolyte comprising a solid electrolyte interphase (SEI) inhibitor, wherein the SEI inhibitor is pyromellitic acid (PMA) or a salt thereof.

2. The electrical power cell of claim 1, wherein the one or more HTC nano-structures comprise one or more HTC nanotubes.

3. The electrical power cell of claim 1, wherein the one or more HTC nano-structures are capable of allowing passage of sodium ions therethrough.

4. The electrical power cell of claim 1, wherein the one or more HTC nano-structures form at least one outer layer covering at least a portion of the anode.

5. The electrical power cell of claim 1, wherein the electrolyte includes 2.25 mmol l(−1) PMA, 0.75 mmol l(−1) hexamethonium hydroxide, and 12 mmol l(−1) TEA.

6. The electrical power cell of claim 1, wherein the PMA has a pH of about 7.8+/−0.1.

7. The electrical power cell of claim 1, wherein the HTC nano-structures include HTC carbon nano-particles having an average size of 10 nm.

8. The electrical power cell of claim 1, wherein the cathode is made from $Mn_2O_4$.

9. An electrical power cell, comprising:
    a cathode capable of accepting sodium ions;
    an anode, the anode comprising one or more hydrothermal carbon (HTC) nano-structures; and
    an electrolyte in contact with the anode and the cathode, the electrolyte comprising a solid electrolyte interphase (SEI) inhibitor, wherein the SEI inhibitor is selected from one or more of inorganic and organic anions based on poly(2,6-dimethyl-1,4-phenylene oxide) (PPO).

10. The electrical power cell of claim 9, wherein the one or more HTC nano-structures comprise one or more HTC nanotubes.

11. The electrical power cell of claim 9, wherein the one or more HTC nano-structures are capable of allowing passage of sodium ions therethrough.

12. The electrical power cell of claim 9, wherein the one or more HTC nano-structures form at least one outer layer covering at least a portion of the anode.

13. The electrical power cell of claim 9, wherein the HTC nano-structures include HTC carbon nano-particles having an average size of 10 nm.

14. The electrical power cell of claim 9, wherein the cathode is made from $Mn_2O_4$.

* * * * *